United States Patent

Takarada et al.

[11] Patent Number: 5,416,147
[45] Date of Patent: May 16, 1995

[54] HYDROSILYLATIVE COMPOSITION AND PROCESS OF HYDROSILYLATION REACTION

[75] Inventors: Mitsuhiro Takarada, Takasaki; Yuji Yoshikawa, Annaka; Hiroharu Ohsugi, Hirakata; Yoshio Eguchi, Ikeda, all of Japan

[73] Assignees: Shin-Etsu Chemical Co., Ltd., Tokyo; Nippon Paint Co., Ltd., Osaka, both of Japan

[21] Appl. No.: 165,803

[22] Filed: Dec. 14, 1993

[30] Foreign Application Priority Data

Dec. 14, 1992 [JP] Japan .................. 4-353621

[51] Int. Cl.$^6$ .................. C08K 5/098; C08K 5/04
[52] U.S. Cl. .................. 524/399; 524/398; 523/442; 525/29; 525/100; 525/146; 525/480; 525/523
[58] Field of Search ............... 525/100, 446, 480, 523, 525/29; 524/399, 398; 523/442

[56] References Cited

U.S. PATENT DOCUMENTS

| 4,824,903 | 4/1989 | Aizawa et al. | 524/772 |
| 5,208,289 | 5/1993 | Takarada et al. | 525/100 |
| 5,321,082 | 6/1994 | Ohsugi et al. | 525/101 |

FOREIGN PATENT DOCUMENTS 3-277645  12/1991  Japan .

Primary Examiner—Ralph H. Dean
Attorney, Agent, or Firm—Millen, White, Zelano & Branigan

[57] ABSTRACT

A blend of (A) an acrylic, polyester or epoxy resin having at least two alkenyl or alkynyl groups in a molecule, (B) an organic silicon compound having at least two hydrogen atoms each directly attached to a silicon atom in a molecule, and (C) a hydrosilylaion catalyst is blended with (D) an organic iron or aluminum compound to form a hydrosilylative composition. Component (D) scavenges a catalyst poison, permitting components (A) and (B) to undergo hydrosilylation reaction with the aid of catalyst (C).

16 Claims, No Drawings

HYDROSILYLATIVE COMPOSITION AND PROCESS OF HYDROSILYLATION REACTION

BACKGROUND OF THE INVENTION

1. Field of the Invention

This invention relates to a hydrosilylative composition comprising an acrylic, polyester or epoxy resin having an aliphatic unsaturated bond, a compound having a silylidyne radical and a hydrosilylation catalyst such as platinum and a hydrosilylation reaction process of subjecting the former two compounds to hydrosilylation reaction in the presence of the catalyst. More particularly, it relates to a hydrosilylative composition and process which permit a hydrosilylation reaction to readily proceed even in a system which contains or contacts with catalyst poisons.

2. Prior Art

It is well known that acrylic, polyester or epoxy resins having an aliphatic unsaturated bond and compounds having a silylidyne (≡SiH) radical undergo a hydrosilylation reaction in the presence of hydrosilylation catalysts such as platinum or rhodium series catalysts whereby curing takes place through addition of the silylidyne radical to the unsaturated bond. There were proposed in the art a variety of curable resin compositions which cure through such hydrosilylation reaction.

Since the hydrosilylation reaction is high in reactivity, curing of resin compositions through hydrosilylation reaction has the advantage that the compositions cure uniformly both at the surface and the interior and with a minimal volume loss. Another advantage is that an overall process from the mixing of components to form a composition to the end of curing is energy saving.

Owing to these advantages, coupled with availability in liquid form and ease of handling without a need for special equipment or techniques, the curable resin compositions now find widespread use in a variety of fields. For example, these compositions are used for electrical insulation, mold patterning, junction coating, optical fibers, LIMS molding, silicone gel, release paper, and tackifiers.

However, the hydrosilylation reaction is sensitive to catalyst poisons. More particularly, if such elements as N, P, S, Sn and As, even in trace amounts, are present in the compositions, or if such elements are present in substrates to which the compositions are coated and cured, then these elements become catalyst poisons to considerably inhibit the hydrosilylation reaction. A retarded hydrosilylation reaction can result in short curing.

It is therefore a common practice to carry out the hydrosilylation reaction while utilizing suitable catalyst poison scavenging means. That is, catalyst poisons can be removed from the composition itself or the substrate to which the composition is coated and cured, for example, by pretreating the components of the composition with activated carbon or by heat cleaning the substrate to pyrolytically decompose off the catalyst poisons. It is also possible to carry out the hydrosilylation reaction by raising the reaction temperature to enhance the activity of the hydrosilylation catalyst or by increasing the amount of the hydrosilylation catalyst added.

These approaches, however, are disadvantageous both in process and economy. It is thus desired to ensure that the hydrosilylation reaction proceeds even in the presence of trace amounts of catalyst poisons.

The inventors proposed in Japanese Patent Application Nos. 277645/1991 and 276965/1991 to subject a composition based on an aliphatic unsaturated group-containing resin to a hydrosilylation reaction with organohydrogen-polysiloxane for crosslinking. This composition tends to experience short curing when contacted with crosslinked melamine or urethane coatings. There is a desire for improvement in this respect.

In the coating field, some examples of crosslinking resin compositions through hydrosilylation reaction in a system containing such an element as N, P, S, Sn and As or a system in contact with a material containing such an element are known. Such known solutions include a curing system in which the hydrosilylation reaction is combined with another distinct curing system and a coating system of laying two coats in a single baking step.

In the former composite curing system, the other curing system distinct from the hydrosilylation reaction is, for example, a curing system based on an addition reaction of a hydroxyl-containing resin with a polyisocyanate or a block thereof and a curing system based on an addition reaction of a carboxyl-containing resin with an epoxy-containing resin. In these systems, alkyl ether melamine resins, polyisocyanate and amine compounds (e.g., tributyl-ammonium bromide) used as a catalyst for reaction between carboxyl and epoxy groups form nitrogeneous components. Also phosphates, sulfonates (e.g., para-toluenesulfonate), and tin compounds (e.g., dibutyltin dilaurate) used as a reaction catalyst for the curing system form components containing P, S or Sn. These systems do not drive the hydrosilylation reaction forward.

One known example of the latter system, that is, coating system of two coats/one bake is a metallic base coating/clear coating system. This is the case when the clear coating uses a system of curing through the hydrosilylation reaction and the base coating uses a curing system distinct from the hydrosilylation reaction. However, hydrosilylation reaction is inhibited if the base coating contains a catalyst poison.

There is a desire to have a coating technique capable of driving the hydrosilylation reaction even in the presence of or in contact with such catalyst poisons.

Therefore, an object of the present invention is to provide a hydrosilylation reaction composition and process which permit a hydrosilylation reaction to proceed without inhibition even in the presence of trace amounts of catalyst poisons including such elements as N, P, S, Sn and As.

SUMMARY OF THE INVENTION

Regarding the hydrosilylation reaction between an acrylic, polyester or epoxy resin having at least two alkenyl or alkynyl groups in a molecule and an organic silicon compound having at least two hydrogen atoms each directly attached to a silicon atom in a molecule in the presence of a hydrosilylation catalyst, the inventors have found that the poisoning of a catalyst poison component containing N, P, S, Sn or As is controlled if organic iron compounds such as iron octylate, iron naphthenate and iron acetylacetate or organic aluminum compounds, for example, aluminum alkoxides such as aluminum butoxide, aluminum isobutoxide, and aluminum isopropoxide and aluminum chelates such as acetylacetonatoaluminum and ethylacetoacetonatoaluminum are present in the reaction system. Then, even when such a catalyst poison component is contained in a composition or a substrate with which the composition comes in contact, the hydrosilylation reaction can take place without inhibition. The thus cured composition experiences a minimal volume loss on curing and has many advantages including acid resistance, weathering resistance, solvent resistance, overcoating capability, and mechanical strength. The present invention is predicated on this finding.

Briefly stated, the present invention in a first aspect provides a hydrosilylative composition comprising (A) an acrylic, polyester or epoxy resin having at least two alkenyl or alkynyl groups in a molecule, (B) an organic silicon compound having at least two hydrogen atoms each directly attached to a silicon atom in a molecule, (C) a hydrosilylation catalyst, and (D) at least one of an organic iron compound and an organic aluminum compound.

In a second aspect, the present invention provides a hydrosilylation reaction process comprising the step of subjecting (A) an acrylic, polyester or epoxy resin having at least two alkenyl or alkynyl groups in a molecule and (B) an organic silicon compound having at least two hydrogen atoms each directly attached to a silicon atom in a molecule to a hydrosilylation reaction in the presence of (C) a hydrosilylation catalyst, while adding (D) at least one of an organic iron compound and an organic aluminum compound to the reaction system.

It is not well understood why the addition of an organic iron or aluminum compound permits the hydrosilylation reaction to take place even in the presence of a catalyst poison component containing N, P, S, Sn or As. Though not bound to the theory, we presume as follows. If a catalyst poison is present, a Group VIII transition metal catalyst, such as the hydrosilylation catalyst, coordinates with the catalyst poison so that the hydrosilylation reaction no longer proceeds. Nevertheless, if hydrosilylation reaction is effected in a system where a Group VIII transition metal catalyst coexists with an organic iron or aluminum compound, the organic iron or aluminum compound preferentially coordinates with the catalyst poison so that the Group VIII transition metal may remain active. Thus, even in the presence of a catalyst poison, the hydrosilylation reaction can proceed in the same manner as does in a catalyst poison-free system.

DETAILED DESCRIPTION OF THE INVENTION

The hydrosilylative composition according to the first aspect of the present invention can be prepared as a curable resin composition and includes (A) an acrylic, polyester or epoxy resin having at least two alkenyl or alkynyl groups in a molecule, (B) an organic silicon compound having at least two silylidyne (≡SiH) radicals in a molecule, and (C) a hydrosilylation catalyst.

Component (A) is an acrylic, polyester or epoxy resin which is not particularly limited insofar as it has at least two alkenyl or alkynyl groups in a molecule. Exemplary alkenyl groups include aliphatic unsaturated hydrocarbon groups such as vinyl, allyl, methylvinyl, propenyl, butenyl, isobutenyl, isophenyl, pentenyl and hexenyl groups, and cyclic unsaturated hydrocarbon groups such as cyclopropenyl, cyclobutenyl, cyclopentenyl and cyclohexenyl groups. Exemplary alkynyl groups include ethynyl, propargyl and $\alpha,\alpha$-dimethylpropargyl groups.

The alkenyl-containing acrylic resins can be prepared by copolymerizing alkenyl-containing (meth)acrylates with other radically polymerizable monomers. Examples of the alkenyl-containing (meth)acrylates include alkenyl-containing acrylic monomers such as allyl (meth)acrylate, 3-methyl-3-butenyl (meth)acrylate, 2-butenyl (meth)acrylate, cyclohexenylmethyl (meth)acrylate, 3-methyl-2-butenyl (meth)acrylate, etc. Examples of the radically polymerizable monomer include methyl (meth)acrylate, ethyl (meth)acrylate, n-butyl (meth) acrylate, i-butyl (meth) acrylate, t-butyl (meth)acrylate, 2-ethylhexyl (meth) acrylate, lauryl (meth) acrylate, phenyl (meth) acrylate, benzyl (meth) acrylate, 2-hydroxyethyl (meth) acrylate, 2-hydroxypropyl (meth) acrylate, 4-hydroxybutyl (meth) acrylate, 2-hydroxyethyl (meth)acrylate and $\epsilon$-capolactone adducts, glycidyl (meth) acrylate, 3-trimethoxysilylpropyl (meth)acrylate, 3-triethoxypropyl (meth)acrylate, (meth)acrylic 2-acrylamide, (meth)acrylamide, (meth)acryloyl isocyanate, 2-isocyanatoethyl (meth)acrylate, vinyl acetate, allyl acetate, styrene, $\alpha$-methylstyrene, vinyltrimethoxysilane, vinyltriethoxysilane, maleic acid, itaconic acid, vinylmethyldimethoxysilane, and vinylmethyldiethoxysilane.

Also useful are alkenyl-containing acrylic resins which are prepared by an addition reaction between hydroxyl-containing acrylic resins and alkenyl isocyanate compounds and/or alkenyl-containing carboxylic anhydrides, addition reaction between isocyanato-containing acrylic resins and alkenyl alcohols, addition reaction between carboxyl-containing acrylic resins and alkenyl-containing epoxy compounds, and addition reaction between epoxy-containing acrylic resins and alkenyl-containing carboxylic acids. Alternatively, the alkenyl-containing acrylic resins may be obtained by copolymerizing a hydroxyl-containing acrylic monomer such as hydroxybutyl (meth)acrylate and adducts of 2-hydroxyethyl (meth)acrylate and $\epsilon$-caprolactone (e.g., Praccell FM series commercially available from Daicell Chemical Industry K.K.) with another one of the above-mentioned acrylic monomers and less than 50% by weight of an $\alpha,\beta$-unsaturated vinyl monomer or by polymerizing hydroxyl-containing acrylic monomers singly (homopolymers).

Among the above-mentioned components, examples of the alkenyl isocyanate compound include allyl isocyanate, (meth)acryloyl isocyanate, and 2-isocyanatoethyl (meth)acrylate. Exemplary alkenyl-containing carboxylic anhydrides are itaconic anhydride and maleic anhydride.

Examples of the isocyanato-containing acrylic resin include those resins obtained by copolymerizing an isocynato-containing acrylic monomer such as (meth)acryloyl isocyanate and 2-isocyanatoethyl (meth)acrylate with another one of the above-mentioned acrylic monomers and less than 50% by weight of an $\alpha,\beta$-unsaturated vinyl monomer or by polymerizing an isocyanato-containing acrylic monomer singly (homopolymers). Exemplary alkenyl alcohols are allyl alcohol, vinyl alcohol, 3-buten-1-ol, and 2-(allyloxy)ethanol.

Examples of the carboxyl-containing acrylic resins include those resins obtained by copolymerizing a carboxyl-containing acrylic monomer such as (meth)acrylic acid with less than 50% by weight of a carboxyl-containing $\alpha,\beta$-unsaturated vinyl monomer such as itaconic acid and maleic acid or by polymerizing a carboxyl-containing acrylic monomer singly (homopolymers). Allyl glycidyl ether is an exemplary alkenyl-containing epoxy compound.

Examples of the epoxy-containing acrylic resins include those resins obtained by copolymerizing an epoxy-containing acrylic monomer such as glycidyl (meth)acrylate with another one of the above-mentioned acrylic monomers and less than 50% by weight of an α, β-unsaturated vinyl monomer or by polymerizing an epoxy-containing acrylic monomer singly (homopolymers). Exemplary alkenyl-containing carboxylic acids are allyl acetate, (meth)acrylic acid, 2-butenoic acid, and 3-butenoic acid.

Secondary, the polyester resin having at least two alkenyl groups in a molecule may be selected from those obtained by polycondensation of the above-mentioned alkenyl alcohols and polyhydric alcohols with polybasic acids.

Examples of the polyhydric alcohol include ethylene glycol, propylene glycol, 1,6-hexane diol, diethylene glycol, neopentyl glycol, hydroxypivalic acid neopentyl glycol ester, trimethylol propane, and both end alcoholic hydroxyl-terminated dimethylsiloxane. Examples of the polybasic acid include phthalic anhydride, isophthalic acid, terephthalic acid, adipic acid, azelaic acid, and trimellitic acid. If desired, a monohydric alcohol or monobasic acid may be partially used.

Also useful are alkenyl-containing polyester resins which are prepared by subjecting a carboxyl group of polyester resins resulting from polycondensation of the above-mentioned polyhydric alcohols and polybasic acids to an addition reaction with the above-mentioned alkenyl-containing epoxy compounds or by subjecting a hydroxyl group of polyester resins resulting from polycondensation of the above-mentioned polyhydric alcohols and polybasic acids to an addition reaction with the above-mentioned alkenyl isocyanate and/or alkenyl-containing carboxylic anhydrides.

Thirdly, the epoxy resin having at least two alkenyl groups in a molecule may be selected from those obtained by addition reaction of the above-mentioned epoxy-containing acrylic resins or bisphenol-A diglycidyl ether, for example, to the above-mentioned alkenyl-containing carboxylic acids or by addition reaction of a hydroxyl group in epi-bis type epoxy resins to the above-mentioned alkenyl isocyanates and/or alkenyl-containing carboxylic anhydrides.

Next, the alkenyl group-containing resins are described. The alkynyl-containing acrylic resins used herein can be prepared by copolymerizing alkynyl-containing acrylic monomers such as propargyl (meth)acrylate, propargyl (meth)acryloylcarbamate, and 2-propargyloxycarbonyloxyethyl (meth)acrylate with other polymerizable monomers.

The alkenyl-containing acrylic monomers may be selected from those obtained by dehydrochlorination reaction between methacrylic chloride and propargyl alcohols or acetylene alcohols, ester exchange reaction between lower esters of (meth)acrylic acid and propargyl alcohols or acetylene alcohols, addition reaction between isocyanato-containing acrylic monomers and propargyl alcohols or acetylene alcohols, and reaction between propargyl chloroformate and 2-hydroxyethyl (meth) acrylate.

The other polymerizable monomers are preferably acrylic monomers. Examples of the acrylic monomer include methyl (meth)acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth) acrylate, adducts of 2-hydroxyethyl (meth) acrylate and ε-caprolactone (e.g., trade name Praccell FMI commercially available from Daicell Chemical Industry K.K.), glycidyl (meth)acrylate, 3-trimethoxysilylpropyl (meth)acrylate, 3-triethoxysilylpropyl (meth)acrylate, 3-dimethoxymethylsilylpropyl (meth)acrylate, (meth)acrylate, (meth)acrylic 2-acrylamido-2-methylpropanesulfonate, acid phosphoxypropyl methacrylate, tributyltin (meth)acrylate, (meth)acrylamide, (meth)acryloyl isocyanate, and 2-isocyanatoethyl (meth)acrylate. Monomers other than the acrylic monomers, for example, styrene, α-methylstyrene, itaconic acid, maleic acid, vinyl acetate, allyl acetate, vinyltrimethoxysilane, vinyltriethoxysilane, vinylmethyldimethoxysilane, and vinylmethyldiethoxysilane may also be used for polymerization as the other polymerizable monomers. However, these monomers should preferably be used in amounts of less than 50% by weight.

Also the alkynyl-containing acrylic resins may be prepared by reaction between hydroxyl-containing acrylic resins and alkynyl-containing chloroformate or alkynyl-containing carboxylic acids, addition reaction between isocynato-containing acrylic resins and propargyl alcohols or acetylene alcohols, addition reaction between carboxyl-containing acrylic resins and alkynyl-containing epoxy compounds, and addition reaction between epoxy-containing acrylic resins and alkynyl-containing carboxylic acids.

The hydroxyl-containing acrylic resins used herein may be obtained by copolymerizing a hydroxyl-containing acrylic monomer such as 2-hydroxyethyl (meth)acrylate, 2-hydroxypropyl (meth)acrylate, 4-hydroxybutyl (meth)acrylate, and adducts of 2-hydroxyethyl (meth)acrylate and ε-caprolactone (e.g., Praccell FM series commercially available from Daicell Chemical Industry K.K.) with another one of the above-mentioned acrylic monomers and less than 50% by weight of a non-acrylic monomer or by polymerizing a hydroxyl-containing acrylic monomer singly. Proparglyic acid is typical of the alkynyl-containing carboxylic acid.

The isocynato-containing acrylic resins used herein may be obtained by copolymerizing an isocyanato-containing acrylic monomer such as (meth)acryloyl isocyanate and 2-isocyanatoethyl (meth)acrylate with another one of the above-mentioned acrylic monomers and less than 50% by weight of a non-acrylic monomer or by polymerizing an isocyanato-containing acrylic monomer singly (homopolymers).

The carboxyl-containing acrylic resins used herein may be obtained by copolymerizing a carboxyl-containing acrylic monomer such as (meth)acrylic acid and/or less than 50% by weight of a carboxyl-containing non-acrylic monomer such as itaconic acid and maleic acid with another one of the above-mentioned acrylic monomers and/or less than 50% by weight of a non-acrylic monomer or by polymerizing a carboxyl-containing acrylic monomer singly (homopolymers). Propargyl glycidyl ether is typical of the alkynyl-containing epoxy compound.

The epoxy-containing acrylic resins used herein may be obtained by copolymerizing an epoxy-containing acrylic monomer such as glycidyl (meth)acrylate with another one of the above-mentioned acrylic monomers and less than 50% by weight of a non-acrylic monomer or by polymerizing an epoxy-containing monomer singly (homopolymers). Propargylic acid is typical of the alkynyl-containing carboxylic acid.

Secondary, the polyester resin having at least two alkynyl groups in a molecule may be selected from those obtained by polycondensation of the above-mentioned alkynyl alcohols and polyhydric alcohols with polybasic acids.

Examples of the polyhydric alcohol include ethylene glycol, propylene glycol, 1,6-hexane diol, diethylene glycol, neopentyl glycol, hydroxypivalic acid neopentyl glycol ester, trimethylol propane, and both end alcoholic hydroxyl-terminated dimethylsiloxane. Examples of the polybasic acid include phthalic anhydride, isophthalic acid, terephthalic acid, adipic acid, azelaic acid, and trimellitic acid. If desired, a monohydric alcohol or monobasic acid may be partially used.

Also useful are alkynyl-containing polyester resins which are prepared by addition reaction of a carboxyl group of polyester resins resulting from polycondensation of the above-mentioned polyhydric alcohols and polybasic acids to the above-mentioned alkynyl-containing epoxy compounds or by addition reaction of a hydroxyl group of polyester resins resulting from polycondensation of the above-mentioned polyhydric alcohols and polybasic acids to the above-mentioned alkynyl-containing carboxylic acids.

Thirdly, the epoxy resin having at least two alkynyl groups in a molecule may be selected from those obtained by addition reaction of the above-mentioned epoxy-containing acrylic resins or bisphenol-A diglycidyl ether, for example, to the above-mentioned alkynyl-containing carboxylic acids or by addition reaction of a hydroxyl group in epi-bis type epoxy resins to the above-mentioned alkynyl chloroformates and/or acetylene alcohols of alkynyl-containing carboxylic acids.

In the practice of the invention, the acrylic, polyester and epoxy resins having alkenyl or alkynyl groups should preferably have a molecular weight of about 500 to about 100,000, especially about 2,000 to about 50,000. Resins with a molecular weight of less than 500 would be low in film forming ability or provide insufficient film strength whereas resins with a molecular weight of more than 100,000 are too viscous to work with and thus inadequate as high-solids resin compositions.

Component (B) is an organic silicon compound which is not particularly limited insofar as it has at least two hydrogen atoms each directly attached to a silicon atom in a molecule. Exemplary are organohydrogensilanes and organohydrogensiloxanes. The organohydrogensiloxanes may be linear, cyclic or network and include from oligomers to polymers although tetrasiloxane and higher ones having a viscosity of up to 10,000 centipoise at room temperature are especially preferred when the flexibility of cured coatings and workability are taken into account. Typically component (B) has the following structural formulae:

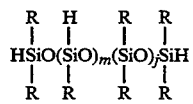

wherein R is a substituted or unsubstituted monovalent hydrocarbon group, preferably an alkyl, cycloalkyl, aralkyl or aryl group having 1 to 8 carbon atoms, more preferably a methyl or phenyl group, and letters k and j are integers of $k \geq 2$ and $j \geq 0$;

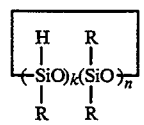

wherein R and j are as defined above, and m is an integer of $m \geq 0$;

wherein R and k are as defined above, and n is an integer of $n \geq 1$; and $$R_pSiH_qO_{(4-p-q)/2}$$

wherein R is as defined above, and p and q are numbers to satisfy $0 < p+q < 2$, $0 < p < 2$, and $0 < q < 2$.

Illustrative, non-limiting examples of component (B) are shown below.

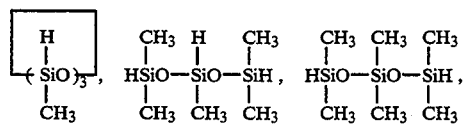

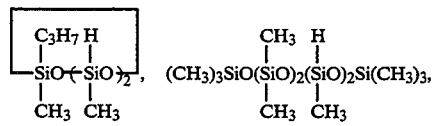

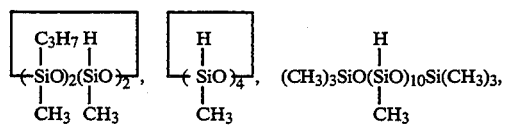

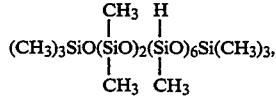

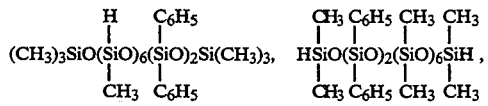

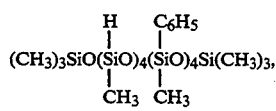

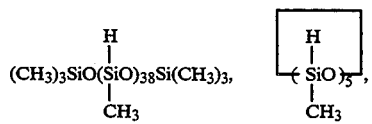

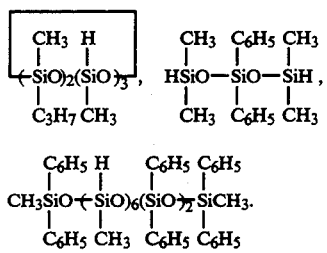

Components (A) and (B) are preferably blended such that the molar ratio of the alkenyl or alkynyl group in component (A) to the hydrogen atom attached to silicon atom in component (B) may range from 1:0.5 to 1:50, especially from 1:1 to 1:10. On this basis, if the proportion of component (B) is less than 0.5, crosslinking would be short. If the proportion of component (B) is more than 50, unreacted component (B) would bleed on a coating.

Component (C) is a hydrosilylation catalyst which is generally selected from transition metals of Group VIII in the Periodic Table and their compounds. Exemplary Group VIII transition metal compounds are complexes of platinum, palladium, rhodium and ruthenium, for example, such as $PtCl_4$, $H_2PtCl_6 \cdot 6H_2O$, Pt-ether complexes, Pt-olefin complexes, $PdCl_2(PPh_3)_2$, $PdCl_2(PhCN)_2$, $RhCl_2(PPh_3)_3$ wherein Ph is phenyl. Other known hydrosilylation catalysts and mixtures of such catalysts are also useful. If desired, these catalysts may be used by diluting with solvents such as alcohol, aromatic, hydrocarbon, ketone and basic solvents.

Component (C) is blended in an amount to give 0.1 to 10,000 parts by weight of metal per million parts by weight of component (B). On this basis, catalysis is insufficient with less than 0.1 ppm of component (C) whereas more than 10,000 ppm of component (C) would cause the cured coating to be colored due to the catalyst's own color and is economically disadvantageous since the Group VIII metals are expensive.

According to the present invention, a catalyst poison controlling component (D) in the form of an organic iron or aluminum compound is added to a blend of components (A), (B) and (C).

The organic iron and aluminum compounds as component (D) are not particularly limited insofar as they are soluble in components (A) and (B). Exemplary organic iron compounds include ferric octylate, ferric acetate, ferric propionate, ferric naphthenate and acetylacetonatoiron. Exemplary organic aluminum compounds are aluminum alkoxides and chelates as shown below.

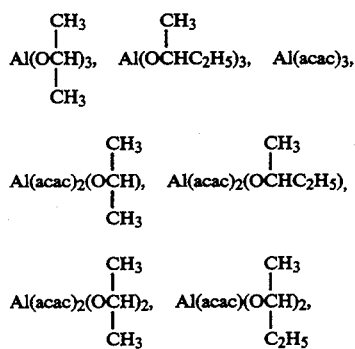

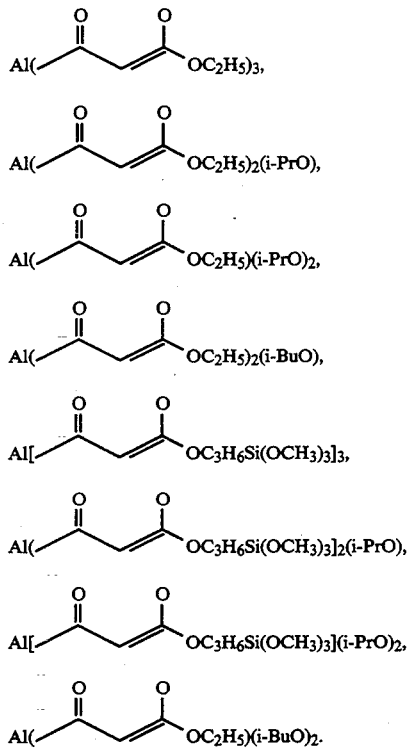

In the formulae, acac is acetylacetonato, Pr is propyl, and Bu is butyl.

Component (D) may be blended in an amount corresponding to the content of catalyst poison. Since even trace amounts of catalyst poison can affect hydrosilylation reaction or catalyst component (C), component (D) is preferably used in a weight of 10 to 10,000 times the weight of the metal of component (C) in order to prohibit any such influence. Less than 10 times the metal weight of component (D) would provide insufficient guard against the catalyst poison whereas more than 10,000 times the metal weight of component (D) would cause the cured coating to be cracked or colored with iron.

In addition to the essential components (A) to (D), the composition of the present invention may further include an agent for controlling the hydrosilylation reaction for the purpose of adjusting ease of operation. Such control agents include acetylene alcohols, siloxane-modified acetylene alcohols, methylvinylcyclotetrasiloxane, and hydroperoxides. Their illustrative examples are given below.

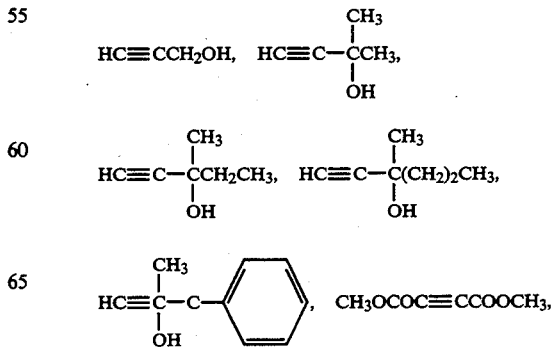

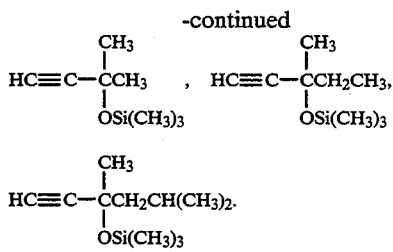

These control agents may be added in any desired amount in accordance with desired operating conditions, typically in an amount of 1 to 1,000% of the metal weight of component (C).

Also if desired, reinforcing fillers may be added to the composition of the invention. Exemplary fillers are reinforcing silica, ground quartz, iron oxide, alumina and vinyl-containing silicone resins.

Various other additives may be used in accordance with the intended use of the composition. Examples include heat resistance modifiers such as oxides and hydroxides of cerium and iron; coloring agents such as organic pigments or dyes and inorganic pigments (e.g., $TiO_2$, $Fe_2O_3$, and C); tackifiers such as carbon functional silanes and siloxanes; mold release agents such as silicone fluid, raw rubber and metal fatty acid salts; flame retardants such as zinc carbonate and calcium carbonate; leveling agents; flow control agents; and anti-settling agents.

Depending on operating conditions, the composition of the invention can be used without solvent. Where component (A) or (B) is highly viscous or component (A) is solid, it may be dissolved in an organic solvent. The organic solvent used herein is not particularly limited insofar as components (A) to (D) are soluble therein. Exemplary solvents are aromatic hydrocarbons such as benzene, toluene and xylene; aliphatic hydrocarbons such as hexane, heptane and octane; ketones such as acetone, methyl ethyl ketone, cyclohexanone, and methyl isobutyl ketone; esters such as ethyl acetate, butyl acetate and isobutyl acetate; and haloalkanes such as 1,1,1-trichloroethane, trichloroethylene and methylene chloride. Toluene and xylene are preferred for industrial purposes.

The procedure of preparing the composition of the invention is not limitative. For example, components (A), (C) and (D) are first dissolved in an organic solvent and the solution is then mixed with component (B).

The hydrosilylation reaction will take place in the composition of the invention under conventional conditions, typically by heating at a temperature of 50° to 150° C.

EXAMPLE

Examples of the invention are given below by way of illustration and not by way of limitation. All parts are by weight.

Prior to Examples and Comparative Examples, preparation examples of metallic paint and synthesis examples of various resin solutions are first described.

Preparation Example 1

A reactor equipped with a stirrer, thermometer, reflux condenser, nitrogen gas inlet tube and dropping funnel was charged with 220 parts of high-boiling aromatic petroleum naphtha (Solvesso #100, Esso Standard Petroleum) and heated to 150° C. while passing nitrogen gas. Thereafter, a mixture (a) shown below was added dropwise to the reactor through the dropping funnel at a constant rate over 3 hours.

| Mixture (a) | Parts by weight |
| --- | --- |
| Ethyl acrylate | 307 |
| Ethyl methacrylate | 292 |
| 2-hydroxyethyl methacrylate | 116 |
| 1:1 adduct of 2-hydroxyethyl methacrylate and ε-caprolactone (Paracell FM-1, Daicell K.K.) | 217 |
| Methacrylic acid | 18 |
| n-dodecylmercaptan | 50 |
| t-butylperoxy-2-ethylhexanoate | 80 |

After the completion of addition of mixture (a), the reactor was maintained at the temperature for 30 minutes. Then a mixture of 10 parts of t-butylperoxy-2-ethylhexanoate and 30 parts of Solvesso #100 was added dropwise at a constant rate over 30 minutes. After the completion of addition, the reaction solution was ripened at 150° C. for 3 hours and then cooled down, obtaining a resin solution A. The resin had a number average molecule weight of 1,800. The resin solution has a non-volatile content of 69.8% by weight and a Gardner viscosity of Z4.

A metallic paint was prepared by mixing 531 parts of resin solution A, 425 parts of methylated melamine (Cymel, Mitsui Toatsu Chemical K.K.), 10 parts of p-toluenesulfonic acid, 240 parts of aluminum paste (Almipaste 7160N, Toyo Alumi K.K.), 10 parts of UV absorber (SEESORB, Shiraishi Calcium K.K.), and 5 parts of 8-acetyl-3-dodecyl-7,7,9,9-tetramethyl-1,3,8-triazospiro(4,5)decane-2,4-dione (Sanol LS-770, Ciba Geigy) in a conventional manner. The metallic paint was diluted with a solvent mixture (toluene/n-butanol/ethoxyethyl acetate =3/1/1) to a viscosity of 15 sec./20° C. as measured in Ford cup #4, obtaining a metallic paint dilution I.

Preparation Example 2

A reactor as used in Preparation Example 1 was charged with 500 parts of ethoxypropanol and heated to 105° C. while passing nitrogen gas. Thereafter, a mixture (b) shown below was added dropwise to the reactor through the dropping funnel at a constant rate over 3 hours.

| Mixture (b) | Parts by weight |
| --- | --- |
| 2-hydroxyethyl methacrylate | 140 |
| n-butyl acrylate | 165 |
| methacrylic acid | 50 |
| 2-ethylhexyl methacrylate | 260 |
| Methyl methacrylate | 305 |
| Styrene | 85 |
| Ethoxypropanol | 500 |
| t-butylperoxy-2-ethylhexanoate | 60 |

After the completion of addition of mixture (b), the reactor was maintained at the temperature for 30 minutes. Then a mixture of 3 parts of t-butylperoxy-2-ethylhexanoate and 25 parts of ethoxypropanol was added dropwise at a constant rate over 30 minutes. After the completion of addition, the reaction solution was ripened at 105° C. for 3 hours and then cooled down. To the solution was added 25 parts of diethylene glycol monobutyl ether. The solvent was distilled off at 100° C. under a vacuum of 10 mmHg. To the solution were added 48 parts of diethanolamine and 3750 parts of deionized water, obtaining a resin solution B. The resin had a number average molecule weight of 3,800. The resin solution has a non-volatile content of 20.1% by weight and a viscosity of 80 centipoise.

An agitation mixer was charged with 12 parts of aluminum paste (Almipaste 7160, Toyo Alumi K.K.) and 5 parts of butyl cellosolve, which were agitated for one hour to form an aluminum pigment concentrate. A metallic paint was prepared by mixing the aluminum pigment concentrate with 233 parts of resin solution B, 30 parts of methylated melamine (Cymel, Mitsui Toatsu Chemical K.K.), and 2 parts of p-toluenesulfonic acid in a conventional manner. The metallic paint was diluted with a solvent mixture (toluene/n-butanol/ethoxyethyl acetate =3/1/1) to a viscosity of 15 sec./20° C. as measured in Ford cup #4, obtaining a metallic paint dilution II.

Synthesis Example 1

A reactor as used in Preparation Example 1 was charged with 500 parts of xylene and heated to 130° C. while passing nitrogen gas. Thereafter, a mixture (c) shown below was added dropwise to the reactor over 6 hours.

| Mixture (c) | Parts by weight |
| --- | --- |
| Allyl methacrylate | 40 |
| n-butyl methacrylate | 50 |
| 2,4-diphenyl-4-methyl-1-pentene | 10 |
| t-butylperoxy-2-ethylhexanoate | 10 |

After the completion of addition of mixture (c), the reactor was maintained at the temperature for 30 minutes. Then a mixture of 1 part of t-butylperoxy-2-ethylhexanoate and 10 parts of xylene was added dropwise at a constant rate over 30 minutes. After the completion of addition, the reaction solution was ripened at 130° C. for 3 hours and then cooled down. The solvent was distilled off at 60° C. under a vacuum of 10 mmHg, obtaining a resin solution C. The resin had a number average molecule weight of 2,200. The resin solution has a non-volatile content of 56.2% by weight and a Gardner viscosity of S–T.

Synthesis Example 2

A reactor as used in Preparation Example 1 was charged with 90 parts of Solvesso #100 and heated to 120° C. while passing nitrogen gas. Thereafter, a mixture (d) shown below was added dropwise to the reactor over 3 hours.

| Mixture (d) | Parts by weight |
| --- | --- |
| Styrene | 30 |
| n-butyl methacrylate | 20 |
| 3-methyl-3-butenyl methacrylate | 50 |
| 2,2'-azobis (2-methylbutyronitrile) | 5 |

After the completion of addition of mixture (d), the reactor was maintained at the temperature for 30 minutes. Then a mixture of 0.5 part of 2,2'-azobis(2-methylbutyronitrile) and 4.5 parts of Solvesso #100 was added dropwise at a constant rate over 30 minutes. After the completion of addition, the reaction solution was ripened at 120° C. for 3 hours and then cooled down, obtaining a resin solution D. The resin had a number average molecule weight of 5,000. The resin solution has a non-volatile content of 51.9% by weight and a Gardner viscosity of H.

Synthesis Example 3

A resin solution E was prepared by the same procedure as Synthesis Example 2 except that the 3-methyl-3-butenyl methacrylate was replaced by 2-butenyl methacrylate. The resin had a number average molecule weight of 4,700. The resin solution has a non-volatile content of 48.9% by weight and a Gardner viscosity of F.

Synthesis Example 4

A resin solution F was prepared by the same procedure as Synthesis Example 2 except that the 3-methyl-3-butenyl methacrylate was replaced by 2-propargyloxycarbonyloxyethyl methacrylate. The resin had a number average molecule weight of 2,500. The resin solution has a non-volatile content of 46.9% by weight and a viscosity of 129 centipoise at 25° C.

Synthesis Example 5

A reactor as used in Preparation Example 1 was charged with 90 parts of Solvesso #100 and heated to 130° C. while passing nitrogen gas. Thereafter, a mixture (g) shown below was added dropwise to the reactor over 3 hours.

| Mixture (g) | Parts by weight |
| --- | --- |
| Styrene | 30 |
| n-butyl methacrylate | 20 |
| Cyclohexenylmethyl methacrylate | 50 |
| t-butylperoxy-2-ethylhexanoate | 7 |

After the completion of addition of mixture (g), the reactor was maintained at the temperature for 30 minutes. Then a mixture of 0.5 parts of t-butylperoxy-2-ethylhexanoate and 3.6 parts of Solvesso #100 was added dropwise at a constant rate over 30 minutes. After the completion of addition, the reaction solution was ripened at 130° C. for 3 hours and then cooled down, obtaining a resin solution G. The resin had a number average molecule weight of 3,600. The resin solution has a non-volatile content of 75.3% by weight and a Gardner viscosity of higher than Z6.

Synthesis Example 6

A reactor equipped with a decanter was charged with 42.2 parts of dimethyl terephthalate, 15.1 parts of hydroxypivalic acid neopentyl glycol ester, 6.6 parts of trimethylol propane, 36.9 parts of a silicone compound of the following general formula, and 0.05 parts of dibutyltin oxide.

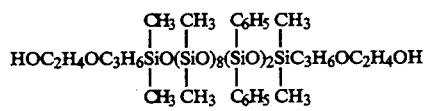

The reactor was heated to 150° C. and then heated from 150° C. to 220° C. over 10 hours for effecting condensation reaction until the removal of methanol reached 10 parts. Thereafter, the reaction temperature was raised to 100° C., 12.5 parts of glycerin diallyl ether was added to the reaction system, which was heated to 220° C. over 2 hours, maintained at the temperature for 2 hours and then cooled down. The methanol removed totaled to 13 parts. The reaction solution was combined with 66 parts of xylol, obtaining a resin solution H. The resin had a number average molecule weight of 2,500. The resin solution has a non-volatile content of 57.7% by weight and a Gardner viscosity of J.

Examples 1-6 & Comparative Examples 1-2

A series of clear coating compositions, which are hydrosilylative compositions, were prepared by mixing the components as shown in Table 1 to a viscosity of 25 sec./20° C. as measured in Ford cup #4.

Clear coating composition I was spray coated onto a soft steel strip (which had been degreased and chemically treated with zinc phosphate) to a thickness of 35 μm, allowed to stand at room temperature for 10 minutes, and baked at 140° C. for 25 minutes, obtaining a coating (1), which was examined by hardness and rubbing tests.

Similarly, clear coating composition II was spray coated onto a similar soft steel strip, allowed to stand, and baked at 180° C. for 25 minutes, obtaining a coating (2), which was similarly tested.

For clear coating compositions III to VIII, the test procedure is as follows. A test piece was obtained by subjecting a similar soft steel strip to cationic electrodeposition, primer coating and sanding. Metallic coating solution I or II was coated to the test piece to a thickness of 20 μm and set at room temperature for 5 minutes. Directly thereafter in the case of metallic coating solution I and after preheating at 80° C. for 5 minutes in the case of metallic coating solution II, each of clear coating compositions III to VIII was coated to the metallic coated test piece to a thickness of 35 μm. Each coating was set at room temperature for 5 minutes and baked at 140° C. for 25 minutes, obtaining coatings (3) to (8), which was similarly tested.

The results are shown in Table 2.

TABLE 1

|  |  | Example |  |  |  |  |  | Comparative Example |  |
|---|---|---|---|---|---|---|---|---|---|
|  |  | 1 | 2 | 3 | 4 | 5 | 6 | 1 | 2 |
| Clear coating composition |  | I | II | III | IV | V | VI | VII | VIII |
| Resin solution (C) |  |  |  |  | 101.8 |  |  | 101.8 |  |
| Resin solution (D) |  |  |  | 108.8 |  |  |  |  | 108.8 |
| Resin solution (E) |  |  |  |  |  | 110.6 |  |  |  |
| Resin solution (F) |  |  |  |  |  |  | 159.9 |  |  |
| Resin solution (G) |  | 79.7 |  |  |  |  |  |  |  |
| Resin solution (H) |  |  | 120.0 |  |  |  |  |  |  |
| Silicone compound | 1) | 40.0 | 30.7 | 43.5 | 42.8 | 45.9 | 25.0 | 42.8 | 43.5 |
| Cynol LS - 440 | 2) | 1.0 |  | 1.0 |  |  |  |  | 1.0 |
| Irganox 1010 | 3) | 0.4 |  | 0.4 | 0.4 | 0.4 | 0.4 | 0.4 | 0.4 |
| Modaflow | 4) | 0.3 |  | 0.3 | 0.3 | 0.3 | 0.3 | 0.3 | 0.3 |
| Curing agent T - 50 | 5) | 3.5 | 1.2 | 1.5 | 1.0 | 2.5 | 2.0 | 1.0 | 1.5 |
| Retarder | 6) | 3.5 |  | 4.5 | 3.0 | 5.0 | 4.0 | 3.0 | 4.5 |
| ALCH | 7) | 3.0 | 3.0 | 2.7 | 2.3 | 1.8 | 2.7 |  |  |
| Colonate EH | 8) |  | 5.0 |  |  |  |  |  |  |
| DBTL | 9) |  | 0.05 |  |  |  |  |  |  |

Note:
1) silicone compound structure

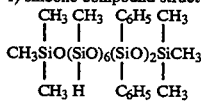

2) hindered amine by Sankyo K.K.
3) phenol compound by Ciba Geigy
4) surface modifier by Monsanto
5) toluene solution of zero valence platinum catalyst containing 0.5% by weight of Pt atom

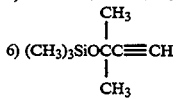

7) aluminum ethylacetate diisopropylate
8) polyisocyanate by Nippon Polyurethane K.K.
9) dibutyltin dilaurate

TABLE 2

|  | Example |  |  |  |  |  | Comparative Example |  |
|---|---|---|---|---|---|---|---|---|
|  | 1 | 2 | 3 | 4 | 5 | 6 | 1 | 2 |
| Coating | (1) | (2) | (3) | (4) | (5) | (6) | (7) | (8) |
| Metallic coating solution |  |  | [I] | [II] | [I] | [II] | [II] | [I] |
| Clear coating composition | [I] | [II] | [III] | [IV] | [V] | [VI] | [VII] | [VIII] |
| Pencil hardness 1) | H | HB | H | HB | HB | HB | <6B | <6B |
| Rubbing test 2) | OK | OK | OK | OK | OK | OK | white turbid dissolved | white turbid dissolved |

Note:
1) measured according to JIS K5400, items 6-14
2) The rubbing test was by rubbing the coating with xylene-impregnated cotton wadding (1 × 1 cm) 50 strokes and then visually observing the outer appearance.

As seen from Table 2, the clear coating compositions within the scope of the invention cured satisfactorily in all situations that they were coated directly to zinc phosphated steel strips (Examples 1 and 2), that they were coated to the metallic coating containing a catalyst poison, and that they themselves contained a catalyst poison. Full curing indicated that hydrosilylation reaction took place to completion.

According to the present invention, component (D) permits components (A) and (B) to undergo hydrosilylation reaction with the aid of a hydrosilylation catalyst even in the presence of a catalyst poison.

Although some preferred embodiments have been described, many modifications and variations may be made thereto in the light of the above teachings. It is therefore to be understood that within the scope of the appended claims, the invention may be practiced otherwise than as specifically described.

We claim:

1. A hydrosilylative composition comprising
   (A) an acrylic, polyester or epoxy resin having at least two alkenyl or alkynyl groups in a molecule,
   (B) an organic silicon compound having at least two hydrogen atoms each directly attached to a silicon atom in a molecule,
   (C) a hydrosilylation catalyst, and
   (D) at least one of an organic iron compound or an organic aluminum compound.

2. The composition of claim 1, wherein component (D) is an organic iron compound.

3. The composition of claim 2, wherein the organic iron compound is ferric octylate, ferric acetate, ferric propionate, ferric naphthenate or acetylacetanato-iron.

4. The composition of claim 1, wherein component (D) is an organic aluminum compound.

5. The composition of claim 4, wherein the organic aluminum compound is an aluminum alkoxide or aluminum chelate.

6. The composition of claim 1, wherein the acrylic, polyester or epoxy resin has a molecular weight of about 500 to 100,000.

7. The composition of claim 1, wherein component (B) is an organohydrogensilane or organohydrogensiloxane.

8. The composition of claim 1, wherein components (A) and (B) are provided in amounts such that the molar ratio of the alkenyl or alkynyl groups in component (A) to the hydrogen atoms attached to a silicon atom in component (B) is from 1:0.5 to 1:50.

9. The composition of claim 1, wherein the hydrosilylation catalyst (C) is a complex or compound containing a metal selected from the group consisting of platinum, palladium, rhodium and ruthenium.

10. The composition of claim 9, wherein the amount of component (D) is 10 to 10,000 times the weight of the metal in component (C).

11. A hydrosilylation reaction process comprising the steps of:
    subjecting (A) an acrylic, polyester or epoxy resin having at least two alkenyl or alkynyl groups in a molecule and (B) an organic silicon compound having at least two hydrogen atoms each directly attached to a silicon atom in a molecule to a hydrosilylation reaction in the presence of (C) a hydrosilylation catalyst, and
    adding (D) at least one of an organic iron compound or an organic aluminum compound to the reaction system.

12. The process of claim 11 wherein the hydrosilylation reaction is effected in a system containing an element selected from the group consisting of N, P, S, Sn and As or in a system in contact with a material containing at least one of said elements.

13. The process of claim 11, wherein component (D) is an organic iron compound.

14. The process of claim 13, wherein the organic iron compound is ferric octylate, ferric acetate, ferric propionate, ferric naphthenate or acetylacetanato-iron.

15. The process of claim 11, wherein component (D) is an organic aluminum compound.

16. The process of claim 15, wherein the organic aluminum compound is an aluminum alkoxide or aluminum chelate.

* * * * *